(12) United States Patent  
Nakajima (10) Patent No.: US 8,917,404 B2  
(45) Date of Patent: *Dec. 23, 2014

(54) IMAGE FORMING SYSTEM, IMAGE FORMING METHOD, AND IMAGE FORMING APPARATUS THAT TRANSFERS A SETTING VALUES SET

(71) Applicant: KYOCERA Document Solutions Inc., Osaka (JP)

(72) Inventor: Koki Nakajima, Osaka (JP)

(73) Assignee: KYOCERA Document Solutions Inc. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/252,051

(22) Filed: Apr. 14, 2014

(65) Prior Publication Data

US 2014/0226184 A1    Aug. 14, 2014

Related U.S. Application Data

(62) Division of application No. 13/026,821, filed on Feb. 14, 2011, now Pat. No. 8,730,517.

(30) Foreign Application Priority Data

Feb. 19, 2010    (JP) .................................. 2010-035339

(51) Int. Cl.  
*G06F 3/12*    (2006.01)  
*H04N 1/00*    (2006.01)

(52) U.S. Cl.  
CPC ............ *G06F 3/1255* (2013.01); *G06F 3/1205* (2013.01); *G06F 3/1257* (2013.01); *G06F 3/1291* (2013.01); *H04N 1/00204* (2013.01); *H04N 1/00347* (2013.01); *H04N 1/00427* (2013.01); *H04N 1/00973* (2013.01); *G06F 3/1232* (2013.01); *H04N 2201/0013* (2013.01); *H04N 2201/0039* (2013.01); *H04N 2201/0074* (2013.01)  
USPC ............ 358/1.13; 358/1.2; 358/1.15; 358/1.9

(58) Field of Classification Search  
CPC . G06F 3/1205; G06F 3/1257; H04N 1/00427; H04N 1/00973; H04N 2201/0039  
USPC .......................................... 358/1.2, 1.13, 1.9  
See application file for complete search history.

(56) References Cited

FOREIGN PATENT DOCUMENTS

| JP | 2005-349657 | A |   | 12/2005 |   |
|----|-------------|---|---|---------|---|
| JP | 2008-027127 | A |   | 2/2008  |   |
| JP | 2008027127  |   | * | 7/2008  | ................ G06F 3/12 |

* cited by examiner

*Primary Examiner* — King Poon  
*Assistant Examiner* — Iriana Cruz  
(74) *Attorney, Agent, or Firm* — McDonnell Boehnen Hulbert & Berghoff LLP (57) ABSTRACT

An image forming apparatus stores a setting values set including core data independent of a model of the image forming apparatus and non-core data not included in the core data; writes the core data on another image forming apparatus without change, and if the model of the image forming apparatus is the same as the model of the another image forming apparatus, writes the non-core data on the another image forming apparatus without change, while if the model of the image forming apparatus is not the same as the model of the another image forming apparatus, writes the non-core data including a setting value of a function setting in the non core-data that is the same as the function setting in the another image forming apparatus on the another image forming apparatus.

5 Claims, 10 Drawing Sheets

IMAGE FORMING SYSTEM, IMAGE FORMING METHOD, AND IMAGE FORMING APPARATUS THAT TRANSFERS A SETTING VALUES SET

CROSS-REFERENCE TO RELATED APPLICATION AND INCORPORATION BY REFERENCE

This divisional patent application claims priority to U.S. patent application Ser. No. 13/026,821 filed on Feb. 14, 2011, and is based upon, and claims the benefit of priority from, corresponding Japanese Patent Application No. 2010-035339, filed in the Japan Patent Office on Feb. 19, 2010, the entire contents of which are is incorporated herein by reference.

BACKGROUND

1. Field of the Invention

The present invention relates to an image forming system, an image forming method, and an image forming apparatus.

2. Description of the Related Art

An image forming apparatus such as a multifunction peripheral has a copy function, a facsimile transmission function, and other functions. There are a large number of function settings for respective functions in the image forming apparatus. Therefore, a certain kind of image forming apparatus has a program function that stores a combination of setting values as a setting values set and collectively sets values for the function settings by using the setting values set. This allows a user to register a large number of setting values from the setting values set.

Meanwhile, another kind of image forming apparatus has a function that acquires a setting values set from a different image forming apparatus and registers the setting values set.

In a case of using the above-described program function, the image forming apparatus determines whether or not a process can be performed based on respective function settings from the acquired setting values set.

The image forming apparatus includes two or more hundred function settings. Therefore, as in the above-described program function, if it must be determined whether or not a process can be performed based on respective function settings, it may take a long time to transfer the setting values set between the image forming apparatuses.

SUMMARY

The present disclosure is related to an image forming system and an image forming apparatus that can transfer a setting values set between image forming apparatuses in a short time period.

An image forming system according to an aspect of the present disclosure includes a first image forming apparatus, a second image forming apparatus, and a terminal device configured to acquire a setting values set from the first image forming apparatus and write the acquired setting values set on the second image forming apparatus. The setting values set includes core data that has a setting value of a function setting independent of a model of an image forming apparatus and non-core data that has a setting value of a function setting not included in the core data. The terminal device writes the core data from the first image forming apparatus to the second image forming apparatus without change. If the model of the first image forming apparatus is the same as the model of the second image forming apparatus, the terminal device writes the non-core data from the first image forming apparatus to the second image forming apparatus without change. If the model of the first image forming apparatus is not the same as the model of the second image forming apparatus, the terminal device writes the non-core data having the setting value of the function setting that is the same as the function setting in the second image forming apparatus to the second image forming apparatus.

An image forming apparatus according to an aspect of the present disclosure includes a storage device that stores a setting values set. The setting values set includes core data having a setting value of a function setting independent of a model of the image forming apparatus, and non-core data having a setting value of a function setting not included in the core data. A setting values set transmission unit writes the core data and the non-core data to another image forming apparatus. A transfer management unit causes the setting values set transmission unit to write the core data in the storage device on the another image forming apparatus without change. If the model of the image forming apparatus is the same as the model of the another image forming apparatus, the transfer management unit causes the setting values set transmission unit to write the non-core data to the storage device on the another image forming apparatus without change. If the model of the image forming apparatus is not the same as the model of the another image forming apparatus, the transfer management unit causes the setting values set transmission unit to write the non-core data having the setting value of the function setting that is the same as the setting value in the another image forming apparatus on the another image forming apparatus.

An image forming apparatus according to another aspect of the present disclosure includes a storage device that stores a setting values set. The setting values set includes core data having a setting value of a function setting independent of a model of the image forming apparatus, and non-core data having a setting value of a function setting not included in the core data. A setting values set acquisition unit acquires the setting values set from another image forming apparatus. A transfer management unit writes the core data acquired from the another image forming apparatus to the storage device without change. If the model of the image forming apparatus is the same as the model of the another image forming apparatus, the transfer management unit writes the non-core data acquired from the another image forming apparatus to the storage device without change. If the model of the image forming apparatus is not the same as the model of the another image forming apparatus, the transfer management unit writes the non-core data having the setting value of the function setting in the another image forming apparatus that is the same as the function setting in the image forming apparatus to the storage device.

Additional features and advantages are described herein, and will be apparent from the following detailed description and the figures.

DETAILED DESCRIPTION

Figure 1:
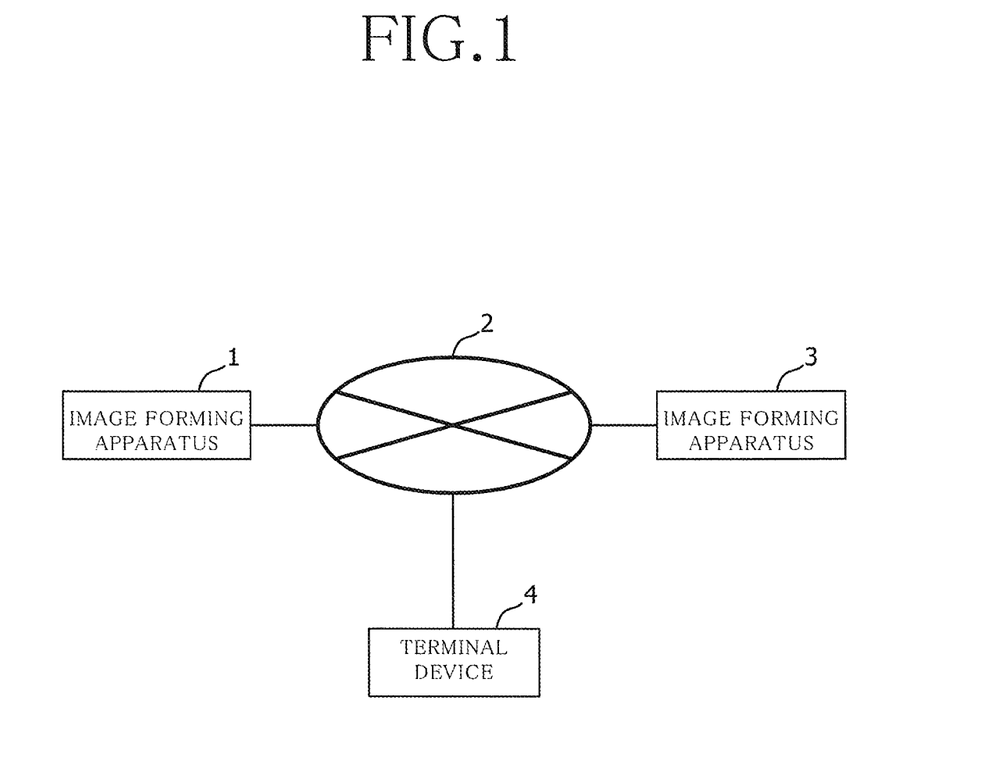
FIG. 1 is a block diagram illustrating a configuration of an image forming system according to a first embodiment.

FIG. 1 is a block diagram illustrating a configuration of an image forming system according to a first embodiment. An image forming apparatus 1 is connected to a network 2, and another image forming apparatus 3 is connected to the network 2. In addition, a terminal device 4 is connected to the network 2. The image forming apparatuses 1 and 3 may be devices such as a printer, a copier, and a multifunction peripheral.

The image forming apparatus 1 stores a setting values set regarding a plurality of function settings. The image forming apparatus 1 has a program function of changing the setting values of a plurality of function settings to the setting values selected based on a user operation. The image forming apparatus 3 also has the same or similar program function as that of the image forming apparatus 1. The image forming apparatus 1 and the image forming apparatus 3 may be of a same model or different models.

The terminal device 4 communicates with the image forming apparatuses 1 and 3 to acquire a setting values set from the image forming apparatus 1 and write the acquired setting values set to the image forming apparatus 3.

Figure 2:
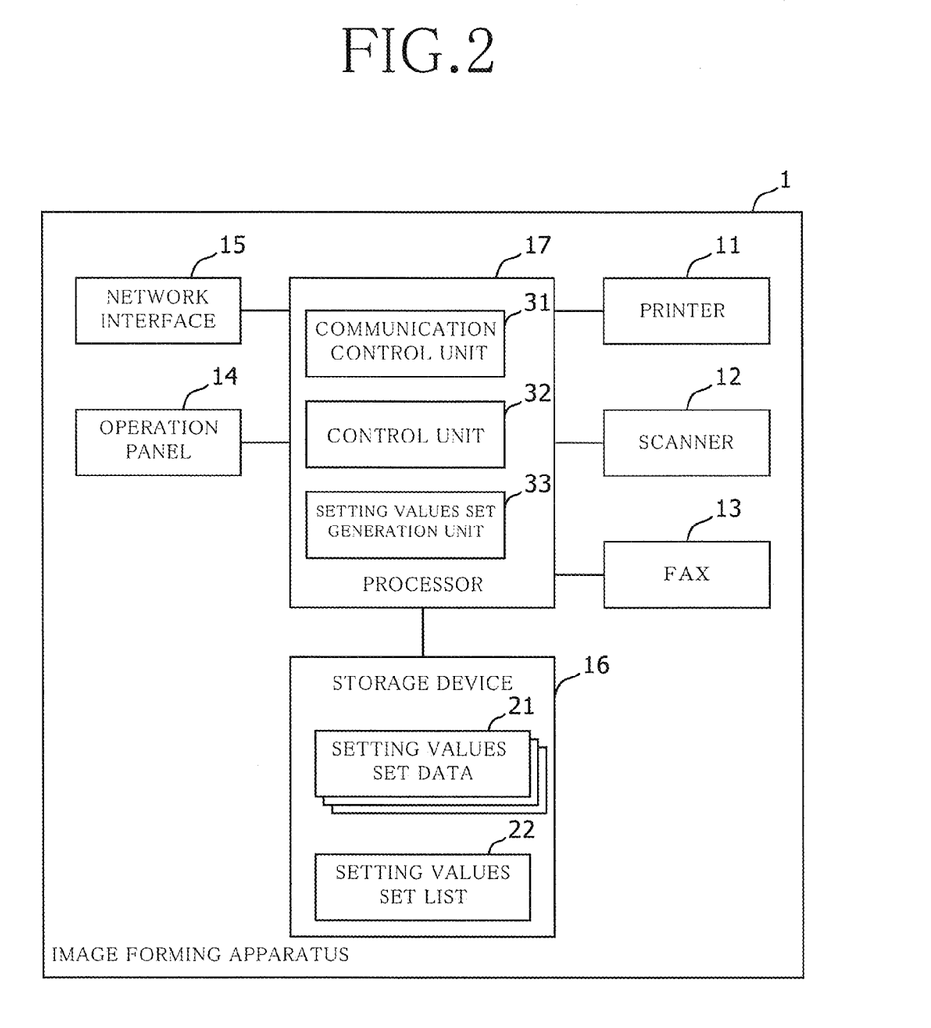
FIG. 2 is a block diagram illustrating a configuration of an image forming apparatus according to the first embodiment.

FIG. 2 is a block diagram illustrating a configuration of the image forming apparatus 1 of FIG. 1.

The image forming apparatus 1 includes a printer 11, a scanner 12, a facsimile apparatus 13, an operation panel 14, a network interface 15, a storage device 16, and a processor 17.

The printer 11 may be an internal apparatus for printing a document image based on print data. The scanner 12 optically reads the document image from a document and generates image data based on the document image. The facsimile apparatus 13 generates a facsimile signal from document data and transmits the facsimile signal, and receives a facsimile signal and converts the facsimile signal into document data.

The operation panel 14, located on a surface of a casing of the image forming apparatus 1, includes a display device for displaying various kinds of information to a user and an input device for detecting a user operation. For example, a liquid crystal display (LCD) may be used as the display device. Input devices may include a key switch, a touch panel, and the like.

The network interface 15 is a circuit connected to the network 2, for performing data communications with other apparatuses (image forming apparatuses 1 and 3) connected to the network 2. The network interface 15 functions as a physical layer of network communications.

The storage device 16 stores various programs and data. The storage device 16 stores one or more of setting values set data 21 and setting values set list 22.

The setting values set data 21 indicates a relation between function settings in a setting values set and setting values.

Figure 3:
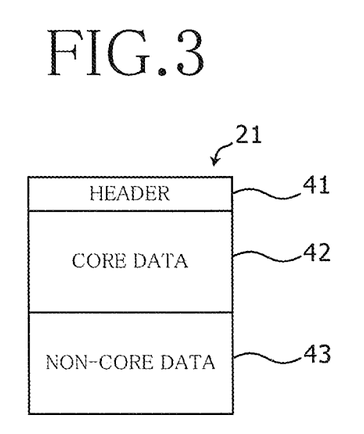
FIG. 3 is a diagram illustrating a structure of setting values set data according to the first embodiment.

FIG. 3 is a diagram illustrating a structure of the setting values set data 21. One item of setting values set data 21 may include a header 41, core data 42, and non-core data 43. The header 41 includes model identification information, such as a model name and a type, of the image forming apparatus 1 and optional function information indicating presence/absence of, for example, a finisher or presence/absence of an additional application, and the like. The core data 42 includes a setting value of a function setting independent of the model of an image forming apparatus. The non-core data 43 includes a setting value of a function setting not included in the core data 42 and that may be dependent on the model of an image forming apparatus.

Examples of a function setting of the core data 42 may include a sheet size setting, a number of copies, a magnification setting, an image quality setting, and the like. It should be noted that, even if a function setting would normally be included in the core data 42, when the range of one or more values that can be set is different between the image forming apparatuses, the function setting is removed from the core data 42 and instead added to the non-core data 43.

Examples of function settings of the non-core data 43 may include a color/monochrome setting, a page aggregation setting, and a sort/stacking setting, and the like.

It should be noted that, classification of function settings into the core data 42 and the non-core data 43 is performed based on a range of models of the image forming apparatus that are to be handled by the image forming system. As the range of models becomes wider, the number of function settings to be classified into the core data 42 becomes smaller, and as the range of models becomes narrower, the number of function settings to be classified into the core data 42 becomes larger.

The setting values set list 22 is a list of the setting values set data 21 stored in the storage device 16. For example, the setting values set list 22 includes registration fields numbered as program numbers 1 to 10. At a time of registration, the setting values set data 21 is registered in any one or more blank registration fields among the program numbers 1 to 10. If there are one or more blank registration fields, the setting values set data 21 is registered in the registration field numbered as, for example, a number specified by the user.

Figure 4:
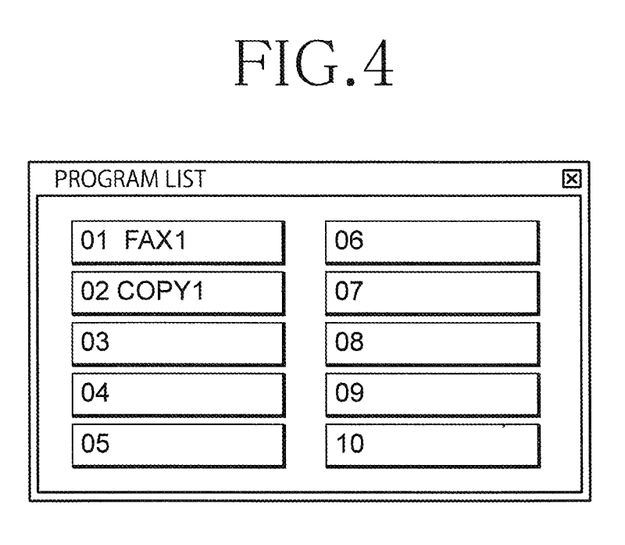
FIG. 4 is a diagram illustrating an example of a program list screen for displaying a list of setting values sets according to the first embodiment.

The setting values set list 22 is used for calling a corresponding setting values set. When a predetermined operation is detected via the operation panel 14 or a host device, a control unit 32 causes the operation panel 14 or the host device to display the setting values set list 22 (that is, program list). FIG. 4 is a diagram illustrating an example of a program list screen for displaying a list of the setting values sets. As illustrated in FIG. 4, selection buttons corresponding to the functions of setting values set data 21 registered in the registration fields of the respective numbers are displayed in the order of the number of the registration field. When one of the selection buttons is depressed by the user, the operation is detected, and the control unit 32 reads the setting values set data 21 corresponding to the depressed selection button, and sets the values specified by the setting values set data 21 for the respective function settings.

Further, the processor 17 is a computer including a central processing unit (CPU), a read only memory (ROM), and a random access memory (RAM), and the processor 17 loads a program from the ROM, the storage device 16, or the like into the RAM, and causes the CPU to execute the program. In this embodiment, a communication control unit 31, the control unit 32, and a setting values set generation unit 33 are implemented by the processor 17.

The communication control unit 31 controls the network interface 15 to perform data communications with the image forming apparatuses 1 and/or 3 connected to the network 2 using a predetermined communication protocol.

The control unit 32 performs at least one of data processing and control of the internal apparatuses (such as printer 11, scanner 12, facsimile apparatus 13, operation panel 14, network interface 15, and storage device 16) based on various instructions received from the host device by the network interface 15 and the communication control unit 31 and various instructions received via the operation panel 14.

When it is detected that a predetermined operation is performed via the operation panel 14 or the host device by the user, the setting values set generation unit 33 identifies current setting values corresponding to the function settings for which the user can set values via the operation panel 14 or the host device. Then, the setting values set generation unit 33 stores a combination of the setting values to the storage device 16 as the setting values set data 21, and registers the setting values set data 21 in the setting values set list 22.

For example, the setting values set list 22 may include the registration fields numbered as the program numbers 1 to 10. The setting values set data 21 is registered in any one of a blank registration field among the program numbers 1 to 10. If there are a plurality of blank registration fields, the setting values set data 21 is registered in, for example, the registration field numbered as the number specified by the user. It should be noted that, when the setting values set data 21 is registered, the program list may be displayed as illustrated in FIG. 4, and the user may be allowed to select the blank registration field.

The image forming apparatus 1 has the above-described configuration. The image forming apparatus 3 may also have the same or similar configuration. If the image forming apparatus 1 and the image forming apparatus 3 are the same model, the image forming apparatus 3 includes the same function settings as the function settings included in the image forming apparatus 1. On the other hand, if the image forming apparatus 1 and the image forming apparatus 3 are not the same model, the image forming apparatus 3 may not include any one of the function settings included in the image forming apparatus 1, and may include a function setting other than the function settings included in the image forming apparatus 1.

Figure 5:
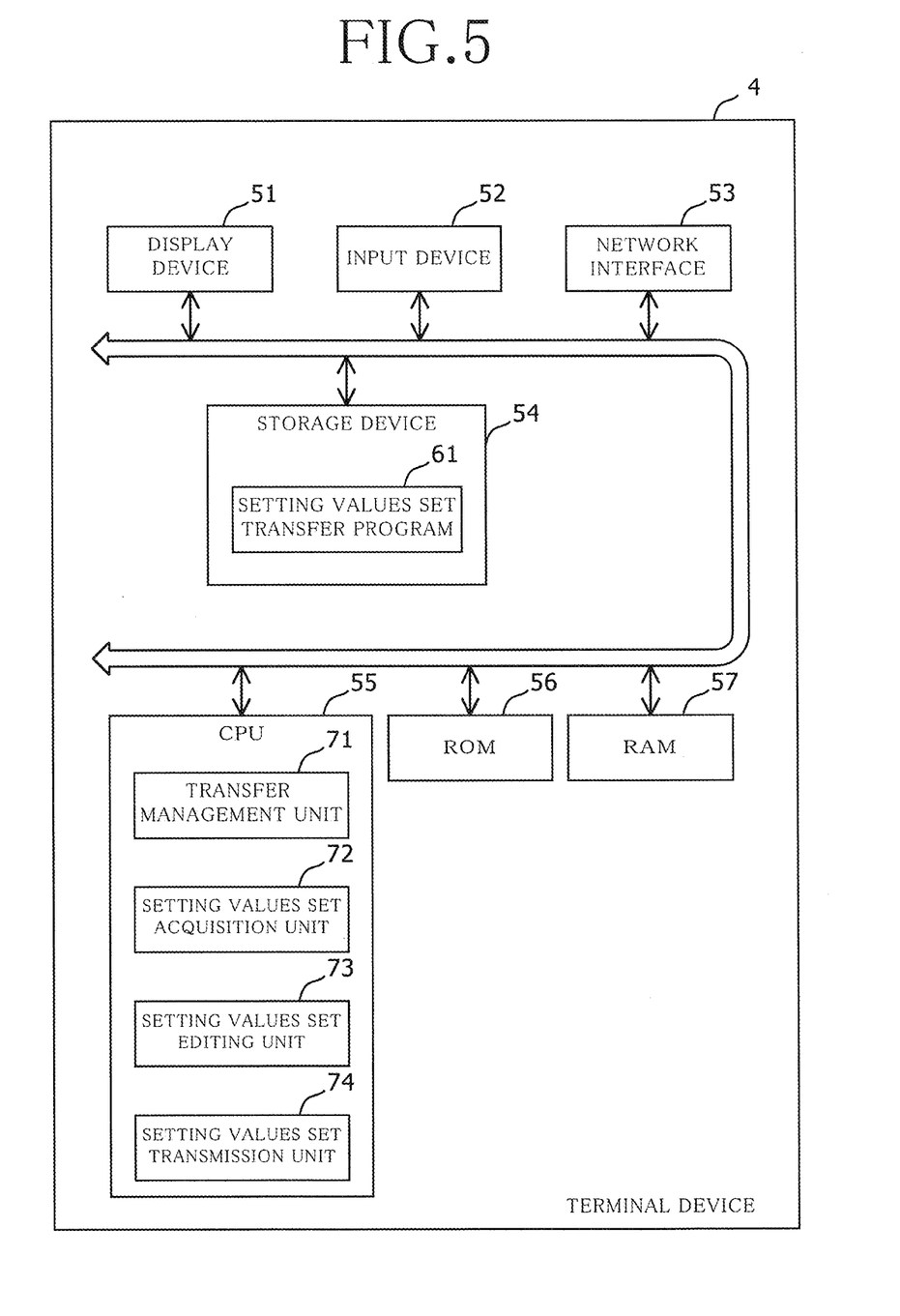
FIG. 5 is a block diagram illustrating a configuration of a terminal device according to the first embodiment.

FIG. 5 is a block diagram illustrating a configuration of the terminal device 4 of FIG. 1. The terminal device 4 illustrated in FIG. 5 has a central processing unit (CPU), and executes various programs to execute calculations and processes. For example, a personal computer incorporating a CPU may be used as the terminal device 4.

In the terminal device 4, a display 51 displays an operation screen and the like. For example, an LCD display may be used as the display device 51. An input device 52 generates input by an operation executed via the operation screen. For example, a keyboard and a mouse may be used as the input device 52. A graphics circuit performs a drawing process and an output of a video signal, and the display 51 displays a screen corresponding to the video signal. An interface performs transmission/reception of data to/from the input device 52.

A network interface 53 that performs data communications includes a circuit connected to the network 2.

A storage device 54 includes a recording medium for storing an operating system, various programs, and various data. Used as the storage device 54 may be a nonvolatile semiconductor memory, a hard disk drive, or a disk array system.

In this embodiment, a setting values set transfer program 61 is stored in the storage device 54.

The setting values set transfer program 61 is a program that acquires a setting values set from the image forming apparatus (here, image forming apparatus 1) and writes the setting values set data 21 based on the setting values set to the another image forming apparatus (here, image forming apparatus 3).

It should be noted that, the setting values set transfer program 61 may be recorded in a portable recording medium such as a CD-ROM or a DVD-ROM, and the recording medium may be distributed. In that case, the setting values set transfer program 61 is installed from the recording medium to the terminal device 4.

A CPU 55 is a processor that executes a process described in a program. A ROM 56 is a nonvolatile memory that pre-stores a program and data. A RAM 57 is a memory that temporarily stores a program and data when the program is being executed. The CPU 55, the ROM 56, and the RAM 57 are connected via a bus and a controller chip, and may further be connected to the storage device 54, the network interface 53, the graphics circuit of the display device 51, and the interface of the input device 52 via the bus and the controller chip.

The CPU 55 loads a program stored in the storage device 54 or the ROM 56 into the RAM 57 and executes the program. The one or more processes described in the program are executed.

A transfer management unit 71, a setting values set acquisition unit 72, a setting values set editing unit 73, and a setting values set transmission unit 74 may be implemented by execution of the setting values set transfer program 61.

The transfer management unit 71 manages the transfer of the setting values set data 21 from the image forming apparatus 1 to the another image forming apparatus 3.

The transfer management unit 71 causes the setting values set transmission unit 74 to write the core data 42 of the setting values set from the image forming apparatus 1 as core data of the setting values set to the image forming apparatus 3, without change.

If the model of the image forming apparatus 1 is the same as the model of the image forming apparatus 3, the transfer management unit 71 causes the setting values set transmission unit 74 to write the non-core data 43 of the setting values set as non-core data of the setting values set to the image forming apparatus 3 without change. On the other hand, if the model of the image forming apparatus 1 is not the same as the model of the image forming apparatus 3, the transfer management unit 71 causes the setting values set transmission unit 74 to write non-core data including the setting values of the function settings in the image forming apparatus 1 that are the same as the function settings in the image forming apparatus 3 as non-core data to the image forming apparatus 3. It should be noted that, the transfer management unit 71 may identify the model of the image forming apparatus 1 from the header 41 of the setting values set, and may inquire the control unit 32 of the image forming apparatus 3 to identify the model of the image forming apparatus 3.

The setting values set acquisition unit 72 acquires the setting values set (setting values set data 21) from the image forming apparatus 1. The setting values set acquisition unit 72 may acquire the header 41, the core data 42, and the non-core data 43 separately or collectively.

If the model of the image forming apparatus 1 is not the same as the model of the image forming apparatus 3, the setting values set editing unit 73 generates non-core data including the values of the function settings included in the image forming apparatus 3 other than the function settings of the core data. In that case, the setting values set editing unit 73 generates a header of the image forming apparatus 3 with the non-core data.

For example, the setting values set editing unit 73 acquires the function settings (that is, function setting list of the non-core data in the image forming apparatus 3) included in the image forming apparatus 3 other than the function settings of the core data and default values from the control unit 32 of the image forming apparatus 3, and generates the non-core data for the image forming apparatus 3.

Further, for example, the setting values set editing unit 73 acquires the function settings (that is, function setting list of the non-core data of the image forming apparatus 3) included in the image forming apparatus 3 other than the function settings of the core data from the control unit 32 of the image forming apparatus 3. Then, the setting values set editing unit 73 generates the non-core data of the image forming apparatus 3 from the values specified for the respective function settings via the user operation on the terminal device 4.

The setting values set transmission unit 74 writes the header 41, the core data 42, and the non-core data 43 to the image forming apparatus 3. The core data 42 is the same as that acquired by the setting values set acquisition unit 72. The header 41 and the non-core data 43 are the same as those acquired by the setting values set acquisition unit 72 or those generated by the setting values set editing unit 73. It should be noted that, the setting values set transmission unit 74 may write the header 41, the core data 42, and the non-core data 43 to the image forming apparatus 3 separately or collectively.

Figure 6:
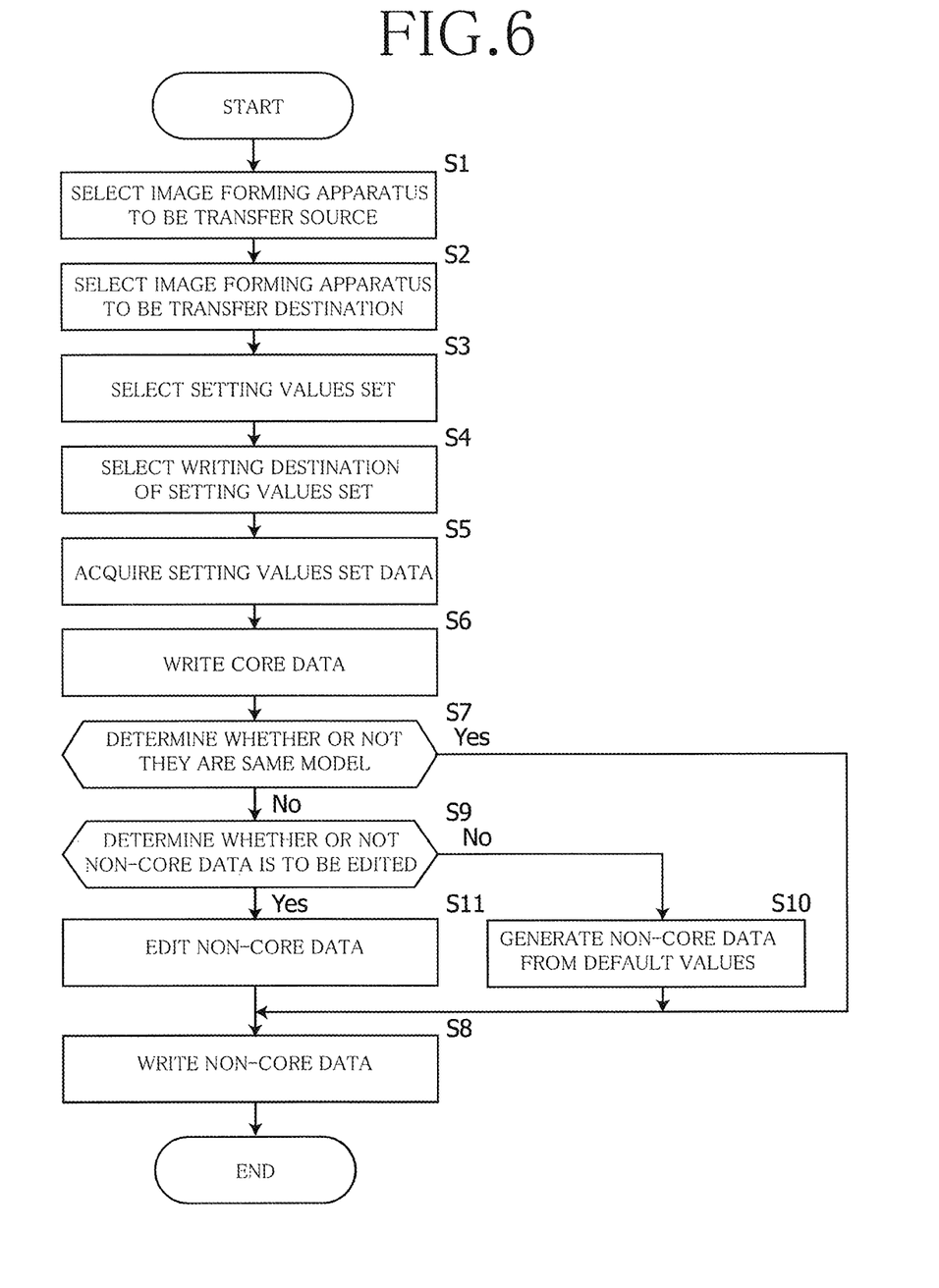
FIG. 6 is a flowchart illustrating a transfer of the setting values set performed by the terminal device according to the first embodiment.

FIG. 6 is a flowchart illustrating a transfer of the setting values set performed by the terminal device 4 according to the first embodiment.

First, the transfer management unit 71 uses the network interface 53 to search for image forming apparatuses connected to the network 2. Then, the transfer management unit 71 causes the display 51 to display a list of the image forming apparatuses on the network 2 (here, image forming apparatuses 1 and 3), and via the user operation on the input device 52, selects the image forming apparatus (here, image forming apparatus 1) to be a transfer source of the setting values set and the image forming apparatus (here, image forming apparatus 3) to be a transfer destination from the list (Steps S1 and S2). At this time, the transfer management unit 71 may search for the image forming apparatus that satisfies a predetermined condition (for example, whether or not the image forming apparatus belongs to a predetermined model group).

Subsequently, the transfer management unit 71 acquires the program list from the image forming apparatus 1 as the transfer source, and causes the display 51 to display the program list. At this time, the transfer management unit 71 communicates with the control unit 32 of the image forming apparatus 1 using a communication protocol such as a simple network management protocol (SNMP) or a hypertext transfer protocol (HTTP). The control unit 32 reads the setting values set list 22, and transmits the setting values set list 22 to the transfer management unit 71. A user operation is performed for selecting a program number corresponding to the setting values set from the program list on the input device 52. When the user operation is detected, the transfer management unit 71 selects the setting values set that is transferred via the user operation (Step S3).

Further, the transfer management unit 71 acquires the program list from the image forming apparatus 3 as the transfer destination, and causes the display 51 to display the program list. At this time, the transfer management unit 71 communicates with the control unit of the image forming apparatus 3 using a predetermined communication protocol such as SNMP or HTTP. The control unit 32 reads the setting values set list 22, and transmits the setting values set list 22 to the transfer management unit 71. A user operation is performed for selecting the program number as a writing destination of the setting values set from the program list on the input device 52. When the user operation is detected, the transfer management unit 71 selects the writing destination of the setting values set that is transferred via the user operation (Step S4).

When the setting values set that is to be transferred and the writing destination are selected, the transfer management unit 71 causes the setting values set acquisition unit 72 to acquire the setting values set data 21. The setting values set acquisition unit 72 acquires the setting values set data 21 on the selected setting values set from the image forming apparatus 1 (Step S5). Then, when the setting values set data 21 is acquired, the transfer management unit 71 causes the setting values set transmission unit 74 to write the core data 42 in the acquired setting values set data 21 to the image forming apparatus 3. The setting values set transmission unit 74 transmits the core data 42 in the acquired setting values set data 21 to the control unit 32 of the image forming apparatus 3, and writes the core data 42 on the selected writing destination at the image forming apparatus 3 (that is, as the core data 42 on the writing destination) (Step S6).

Subsequently, the transfer management unit 71 communicates with the control unit 32 of the image forming apparatus 3, and acquires the model identification information of the image forming apparatus 3. It should be noted that, in Step S4, the transfer management unit 71 may acquire the model identification information with the program list. Then, the transfer management unit 71 acquires the model identification information to the image forming apparatus 1 from the header 41 of the setting values set data 21 acquired from the image forming apparatus 1, and determines from the model identification information whether or not the image forming apparatus 1 and the image forming apparatus 3 are the same model (Step S7).

If it is determined that the image forming apparatus 1 and the image forming apparatus 3 are the same model, the transfer management unit 71 causes the setting values set transmission unit 74 to write the non-core data 43 corresponding to the core data 42 written in Step S6 to the image forming apparatus 3. The setting values set transmission unit 74 transmits the non-core data 43 of the setting values set data 21 acquired from the image forming apparatus 1 to the control unit 32 of the image forming apparatus 3, and writes the non-core data 43 to the selected writing destination at the image forming apparatus 3 (Step S8).

On the other hand, if it is determined that the image forming apparatus 1 and the image forming apparatus 3 are not the same model, the transfer management unit 71 determines, based on editing mode data set via the user operation in advance, whether or not the non-core data is to be edited (Step S9).

If it is determined that the non-core data is not to be edited via the user operation, the transfer management unit 71 causes the setting values set editing unit 73 to automatically generate the non-core data for the image forming apparatus 3. The setting values set editing unit 73 acquires the function settings of the non-core data from the image forming apparatus 3 and the default values from the control unit 32 of the image forming apparatus 3, and generates the non-core data for the image forming apparatus 3 from the acquired function settings and default values (Step S10).

On the other hand, if it is determined that the non-core data is to be edited according to the user operation, the transfer management unit 71 causes the setting values set editing unit 73 to generate the non-core data for the image forming apparatus 3 according to the user operation. The setting values set editing unit 73 acquires, from the control unit 32 of the image forming apparatus 3, the function setting list of the non-core data to the image forming apparatus 3 and permitted value information (such as options that can be set and at least one of upper and lower limits of the options that can be set) on the respective function settings. The setting values set editing unit 73 causes the display 51 to display an input screen for inputting setting values corresponding to the respective function settings in the acquired list, and decides the setting values of the respective function settings that match the permitted value information via the user operation of the input device 52. After that, the setting values set editing unit 73 uses the setting values to generate the non-core data for the image forming apparatus 3 (Step S11).

When the non-core data is generated in Step S10 or S11, the transfer management unit 71 causes the setting values set transmission unit 74 to write the generated non-core data to the image forming apparatus 3 as the non-core data corresponding to the core data 42 written in Step S6. The setting values set transmission unit 74 transmits the generated non-core data to the control unit 32 of the image forming apparatus 3, and writes the non-core data to the selected writing destination at the image forming apparatus 3 (Step S8).

According to the above-described first embodiment, the setting values set includes the core data having a setting value of a function setting independent of the model of the image forming apparatus and the non-core data having a setting value of a function setting not being included in the core data. The terminal device 4 writes the core data in the image forming apparatus 1 as the core data to the image forming apparatus 3 without change. If the model of the image forming apparatus 1 is the same as the model of the image forming apparatus 3, the terminal device 4 writes the non-core data to the image forming apparatus 1 as the non-core data to the image forming apparatus 3 without change. If the model of the image forming apparatus 1 is not the same as the model of the image forming apparatus 3, the terminal device 4 writes the non-core data including the setting value of a function setting in the image forming apparatus 1 that is the same as the function setting in the image forming apparatus 3 as the non-core data to the image forming apparatus 3.

Accordingly, the core data is immediately written to the image forming apparatus as the transfer destination, and hence the transfer of the setting values set can be executed between the image forming apparatuses in a short time period. That is, with regard to the core data, even if the model of the transfer source and the model of the transfer destination are different, it is unnecessary to determine consistency of each of the function settings, which can shorten a time required to transfer the setting values set.

An image forming apparatus according to a second embodiment of the present disclosure transfers and writes the setting values set in the image forming apparatus on another image forming apparatus. That is, the image forming apparatus according to the second embodiment has the same or similar function as that of the terminal device 4 according to the first embodiment.

Figure 7:
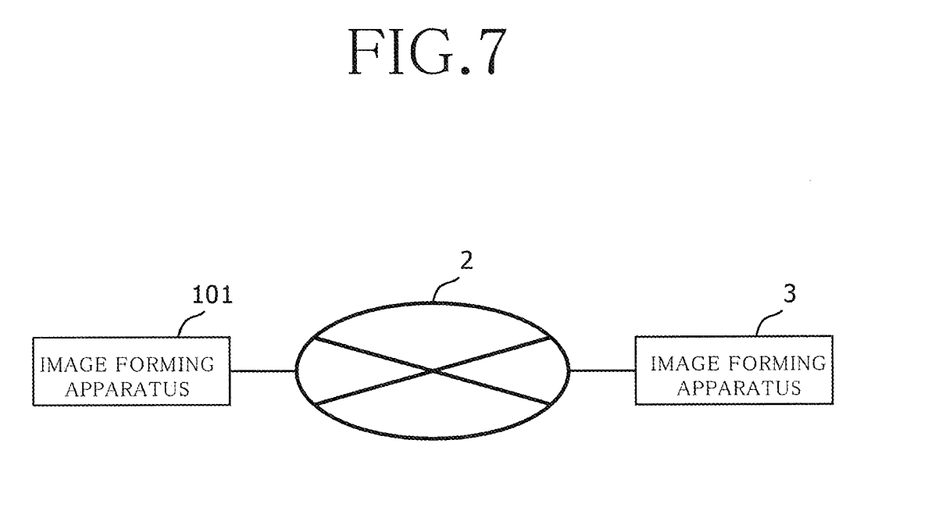
FIG. 7 is a diagram illustrating a configuration of an image forming system according to a second embodiment.

FIG. 7 is a diagram illustrating a configuration of an image forming system according to the second embodiment. In the image forming system illustrated in FIG. 7, an image forming apparatus 101 according to the second embodiment is connected to the network 2, and the setting values set is written from the image forming apparatus 101 to the image forming apparatus 3 via the network 2.

Figure 8:
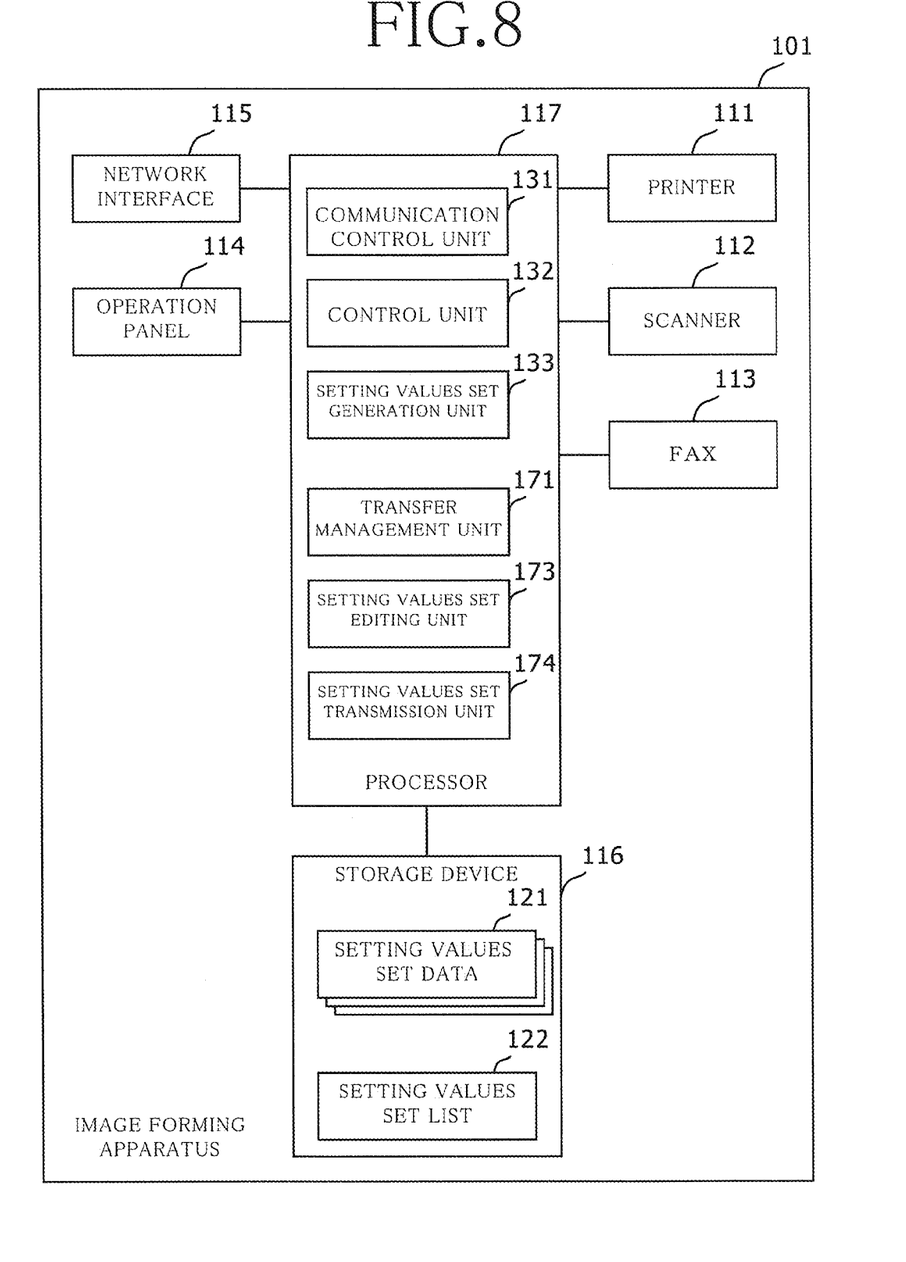
FIG. 8 is a diagram illustrating a configuration of an image forming apparatus according to the second embodiment.

FIG. 8 is a diagram illustrating a configuration of the image forming apparatus 101 according to the second embodiment.

The image forming apparatus 101 includes a printer 111, a scanner 112, a facsimile apparatus 113, an operation panel 114, a network interface 115, a storage device 116, and a processor 117. The printer 111, the scanner 112, the facsimile apparatus 113, the operation panel 114, the network interface 115, the storage device 116, and the processor 117 are substantially the same as the printer 11, the scanner 12, the facsimile apparatus 13, the operation panel 14, the network interface 15, the storage device 16, and the processor 17 according to the first embodiment, respectively.

Setting values set data 121 and a setting values set list 122 included in the storage device 116 are also substantially the same as the setting values set data 21 and the setting values set list 22 according to the first embodiment, respectively.

In the second embodiment, not only are a communication control unit 131, a control unit 132, and a setting values set generation unit 133 implemented by the processor 117, but also a transfer management unit 171, a setting values set editing unit 173, and the setting values set transmission unit 174.

The communication control unit 131, the control unit 132, and the setting values set generation unit 133 have the same or similar function as that of the communication control unit 31, the control unit 32, and the setting values set generation unit 33 according to the first embodiment, respectively.

The transfer management unit 171, the setting values set editing unit 173, and the setting values set transmission unit 174 have the same or similar function as that of the transfer management unit 71, the setting values set editing unit 73, and the setting values set transmission unit 74, respectively according to the first embodiment. However, the transfer management unit 171 further has a function of reading the setting values set data 121 of the setting values set that is to be transferred from the storage device 116. That is, the transfer management unit 171 has a function of the transfer management unit 71 and the setting values set acquisition unit 72.

In the second embodiment, in accordance with the flowchart illustrated in FIG. 6, the transfer management unit 171, the setting values set editing unit 173, and the setting values set transmission unit 174 operate as the transfer management unit 71 and the setting values set acquisition unit 72, the setting values set editing unit 73, and the setting values set transmission unit 74 according to the first embodiment, respectively. In this case, the operation panel 114 is used as a user interface in place of the display 51 and the input device 52 according to the first embodiment.

It should be noted that, since the image forming apparatus 100 includes the functions of the terminal device 4, the process of Step S1 does not need to be executed by image forming apparatus 100.

According to the above-described second embodiment, the image forming apparatus 101 writes the core data in the image forming apparatus 101 as the core data to the image forming apparatus 3 without change. If the model of the image forming apparatus 101 is the same as the model of the image forming apparatus 3, the non-core data in the image forming apparatus 101 is written as the non-core data to the image forming apparatus 3 without change. If the model of the image forming apparatus 101 is not the same as the model of the image forming apparatus 3, the non-core data including the setting value of the function setting in the image forming apparatus 101 that is the same as the function setting in the image forming apparatus 3 is written as the non-core data to the image forming apparatus 3.

Accordingly, the core data is immediately written to the image forming apparatus 3 as the transfer destination, and hence the transfer of the setting values set can be executed between the image forming apparatuses (e.g., 101 and 3) in a short time period. That is, with regard to the core data, even if the model of the transfer source and the model of the transfer destination are different, it is unnecessary to determine consistency of each of the function settings, which can shorten a time required to transfer the setting values set.

An image forming apparatus according to a third embodiment of the present disclosure acquires the setting values set in another image forming apparatus and registers the setting values set as the setting values set of the image forming apparatus. That is, the image forming apparatus according to the third embodiment of the present disclosure has the same function as that of the terminal device 4 according to the first embodiment.

Figure 9:
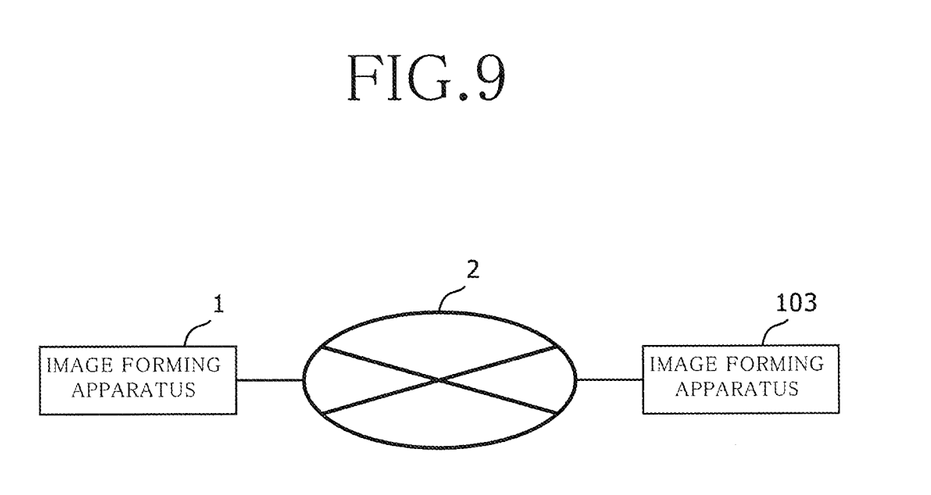
FIG. 9 is a diagram illustrating a configuration of an image forming system according to a third embodiment.

FIG. 9 is a diagram illustrating a configuration of an image forming system according to the third embodiment. In the image forming system illustrated in FIG. 9, an image forming apparatus 103 according to the third embodiment is connected to the network 2, and the setting values set is transferred from the image forming apparatus 1 to the image forming apparatus 103 via the network 2. Then, the image forming apparatus 103 stores the setting values set.

Figure 10:
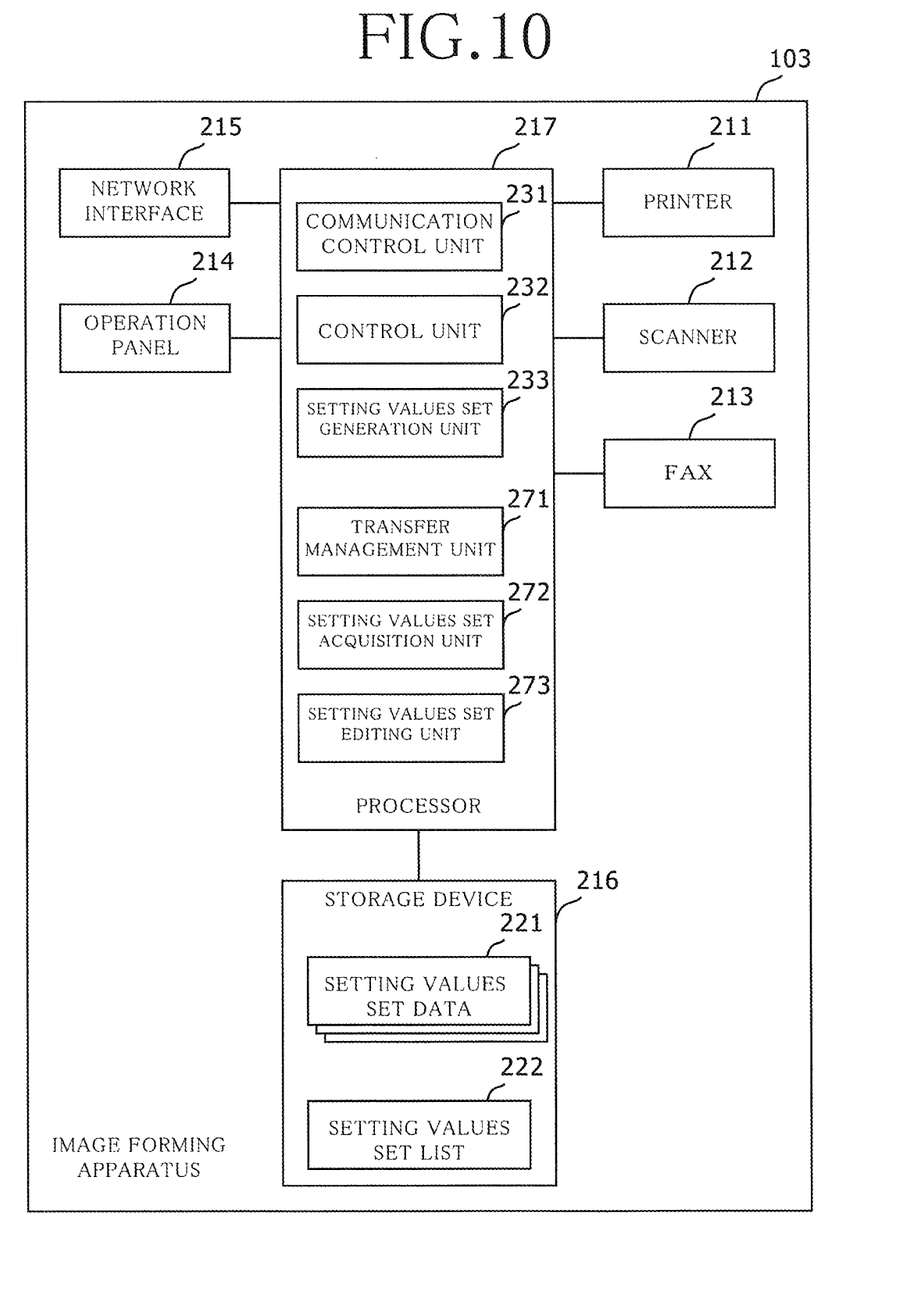
FIG. 10 is a diagram illustrating a configuration of an image forming apparatus according to the third embodiment.

FIG. 10 is a diagram illustrating a configuration of the image forming apparatus 103 according to the third embodiment.

The image forming apparatus 103 includes a printer 211, a scanner 212, a facsimile apparatus 213, an operation panel 214, a network interface 215, a storage device 216, and a processor 217. The printer 211, the scanner 212, the facsimile apparatus 213, the operation panel 214, the network interface 215, the storage device 216, and the processor 217 have the same or similar function as that of the printer 11, the scanner 12, the facsimile apparatus 13, the operation panel 14, the network interface 15, the storage device 16, and the processor 17 according to the first embodiment, respectively.

Setting values set data 221 and a setting values set list 222 in the storage device 216 are also substantially the same as the setting values set data 21 and the setting values set list 22 according to the first embodiment, respectively.

However, in the third embodiment, not only are a communication control unit 231, a control unit 232, and a setting values set generation unit 233 implemented by the processor 217, but also a transfer management unit 271, a setting values set acquisition unit 272, and a setting values set editing unit 273.

The communication control unit 231, the control unit 232, and the setting values set generation unit 233 have the same or similar function as that of the communication control unit 31, the control unit 32, and the setting values set generation unit 33 according to the first embodiment, respectively.

The transfer management unit 271, the setting values set acquisition unit 272, and the setting values set editing unit 273 have the same or similar function as that of the transfer management unit 71, the setting values set acquisition unit 72, and the setting values set editing unit 73, respectively according to the first embodiment. However, the transfer management unit 271 further has a function of registering the setting values set that is transferred to the program list (that is, writing the setting values set to the storage device 216). In other words, the transfer management unit 271 has the functions of the transfer management unit 71 and the setting values set transmission unit 74.

In the third embodiment, in accordance with the flowchart illustrated in FIG. 6, the transfer management unit 271, the setting values set acquisition unit 272 and the setting values set editing unit 273 operate as the transfer management unit 71 and the setting values set transmission unit 74, the setting values set acquisition unit 72, and the setting values set editing unit 73 according to the first embodiment, respectively. In this case, the operation panel 214 is used as a user interface similar to the display 51 and the input device 52 according to the first embodiment.

It should be noted that, since the image forming apparatus 103 includes the functions of the terminal device 4, the process of Step S2 does not need to be executed at image forming apparatus 103.

According to the above-described third embodiment, the image forming apparatus 103 writes the core data from the image forming apparatus 1 as the core data to the image forming apparatus 103 without change. If the model of the image forming apparatus 103 is the same as the model of the image forming apparatus 1, the image forming apparatus 103 writes the non-core data in the image forming apparatus 1 as the non-core data to the image forming apparatus 103 without change. If the model of the image forming apparatus 103 is not the same as the model of the image forming apparatus 1, the image forming apparatus 103 writes the non-core data including the setting value of the function setting in the image forming apparatus 1 that is the same as the function setting in the image forming apparatus 103 as the non-core data on the image forming apparatus 103.

Accordingly, the core data is immediately written to the image forming apparatus 103 as the transfer destination, and hence the transfer of the setting values set can be executed between the image forming apparatuses (e.g., 1 and 103) in a short time period. That is, with regard to the core data, even if the model of the transfer source and the model of the transfer destination are different, it is unnecessary to determine consistency of each of the function settings, which can shorten a time required to transfer the setting values set.

The present disclosure of the embodiments includes various other embodiments. For example, other designs can be used in which the above-described components are each performed.

For example, in the above-described embodiments, the header 41 is also written to the image forming apparatus as the transfer destination with the core data 42, but the image forming apparatus as the transfer destination itself may generate and write the header 41.

Further, in the above-described embodiments, the non-core data 43 is also written to the image forming apparatus as the transfer destination with the core data 42, but the image forming apparatus as the transfer destination itself may generate and write the default value as the setting value of the non-core data.

Further, in the above-described embodiments, the following alternate design may be implemented. A plurality of model groups may be set with the setting values set, and a range of the core data 42 (that is, function settings belonging to the core data 42) that is different according to the model group may be set in advance. When the setting values set data 21 is read from an image forming apparatus as the transfer source, the model group to which both the image forming apparatus of the transfer source and the image forming apparatus of the transfer destination belong may be selected to build the core data 42 in a range of the function settings corresponding to the model group and the non-core data 43 with the other function settings.

Further, in the above-described embodiments, an alert message that prompts the use of a default value may be displayed in Step S10.

Further, in the above-described embodiments, the following alternative may be implemented. The lists of optional functions included in the image forming apparatuses as the transfer source and the transfer destination are acquired from the control unit 32. Even if the model of the image forming apparatus as the transfer source is the same as the model of the image forming apparatus as the transfer destination, when an optional function included in the image forming apparatus as the transfer source is not included in the image forming apparatus as the transfer destination, it may be recognized that both the models are not the same. Accordingly, even if the value of the function setting corresponding to the optional function is included in the non-core data, the setting values set is transferred appropriately.

Further, in the above-described embodiments, the data communications between the image forming apparatuses may be executed using a web service description language (WSDL).

The present disclosure can be applied to the transfer/copy of the setting values set between the image forming apparatuses in an image forming system in which, for example, a plurality of image forming apparatuses such as a printer, a copier, and a multifunction peripheral are connected to an intranet.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An image forming apparatus, comprising:
   a storage device configured to store a setting values set that comprises:
      core data that includes a setting value of a function setting independent of a model of the image forming apparatus; and
      non-core data that includes a setting value of a function setting not included in the core data and that may depend on a model of an image forming apparatus;
   a setting values set acquisition unit configured to acquire the setting values set from another image forming apparatus; and
   a transfer management unit configured to write the core data acquired from the another image forming apparatus to the storage device without change, and if the model of the image forming apparatus is the same as the model of the another image forming apparatus, write the non-core data acquired from the another image forming apparatus to the storage device without change, while if the model of the image forming apparatus is not the same as the model of the another image forming apparatus, write the non-core data including a setting value of the function setting in the another image forming apparatus that is the same as the function setting in the storage device.

2. The image forming apparatus according to claim 1, wherein the transfer management unit uses a default setting value in the image forming apparatus as the setting value of the non-core data if the model of the image forming apparatus is not the same as the model of the another image forming apparatus.

3. The image forming apparatus according to claim 1, wherein the transfer management unit uses a setting value specified via a user operation as the setting value of the non-core data if the model of the image forming apparatus is not the same as the model of the another image forming apparatus.

4. The image forming apparatus according to claim 1, wherein the transfer management unit selects the setting values set from a list of setting values sets in the another image forming apparatus, acquires a writing destination list for setting values sets from the another image forming apparatus, and selects a writing destination of the setting values set from the writing destination list.

5. The image forming apparatus according to claim 1, wherein the transfer management unit regards the model of the image forming apparatus as not being the same as the model of the another image forming apparatus in response to a determination that an optional function included in the another image forming apparatus is not included in the image forming apparatus even if the model of the image forming apparatus is the same as the model of the another image forming apparatus.

* * * * *